RADIO RECEIVING AND TRANSMITTING SYSTEMS

Filed Nov. 21, 1966 2 Sheets-Sheet 1

INVENTOR
Matthew Frederick Radford
BY
Baldwin Wight Diller & Brown
ATTORNEYS

INVENTOR
Matthew Frederick Radford
BY
Baldwin Wight Diller & Brown
ATTORNEYS

United States Patent Office 3,470,559

Patented Sept. 30, 1969

3,470,559

RADIO RECEIVING AND TRANSMITTING SYSTEMS

Matthew Frederick Radford, Essex, England, assignor to The Marconi Company Limited, London, England, a British company Filed Nov. 21, 1966, Ser. No. 595,657
Claims priority, application Great Britain, Dec. 8, 1965, 52,142/65
Int. Cl. H01q *11/10*
U.S. Cl. 343—792.5 8 Claims This invention relates to radio receiving and transmitting systems for high frequency communication.

An important though by no means the exclusive application of the invention is to so-called diversity radio reception. As is well known considerable difficulties are encountered in high frequency radio communication because of distortion brought about by multi-path propagation from the transmitting station to the receiving station. Signals travelling in different modes arrive at the receiving station at slightly different times, reaching the receiver along paths which are of different angles of elevation i.e. at different angles to a horizontal plane at the receiving station.

Diversity receiving systems have of course been well known for many years. In general, in known diversity receiving systems, signals are received on a plurality of different aerials—commonly geographically spaced and/or with different polarisation characteristics—and means are provided for assessing the received signal strengths on the different aerials and automatically selecting, as the source of received signals for utilisation, that aerial which, for the time being, has the strongest signal. Such diversity receiving systems do not, however, provide a satisfactory solution of the problem of distortion caused by multi-path propagation in high frequency radio communication. Apart from their complexity and the space they occupy—and known diversity receiving systems with geographically spaced aerials are usually both complex and occupy a great deal of space—they do not deal satisfactorily with the difficulties caused by the different angles of elevation and different modes of the incoming signals.

One object of the present invention is to provide improved and relatively simple diversity receiving systems which will operate satisfactorily in high frequency communication systems in which multi-path propagation is likely to occur.

The invention is also applicable to radio transmission. It is often the case, in radio transmission that, at certain times, better propagation to a cooperating receiving station is obtained when the transmitted radio beam (directional transmission and/or reception is assumed throughout this specification) has a relatively high elevation angle and at other times better propagation is obtained with a transmitted beam of lower elevation angle. As applied to radio transmission the invention provides an improved system whereby either of two angles of elevation of the transmitted beam can be obtained at will.

According to this invention a high frequency radio transmitting or receiving system comprises an aerial system consisting of two logarithmic aerial arrays which incline towards one another at substantially 90° and each of which is at substantially 45° to the horizontal; and a four port hybrid circuit arrangement having two ports coupled respectively to the two arrays and two other ports serving as signal input or output (as the case may be) ports.

In one form of diversity receiving system in accordance with this invention received signals from the two arrays are fed to two of the ports of the hybrid circuit arrangement and means are provided for taking output to a receiver from either of the two remaining ports of the hybrid circuit arrangement at will. Alternatively, the outputs from said two remaining ports may be taken to two separate detecting receivers and means may be provided for utilising at will the detected output from either receiver. In a further modification the detected output from both receivers is combined and utilised. Preferably, in receiving embodiments in which outputs from the hybrid circuit arrangement are taken to separate receivers the signal paths from the hybrid circuit arrangement output ports to the detected signal output terminals of the receivers are made of different preferably adjustable delays to compensate, at least in part, for different propagation times which may exist between different propagation paths from the transmitter being received. If desired, of course, the detected signal outputs from the receivers may be recorded for subsequent utilisation.

Not the least of the advantages of the invention as applied either to reception or to transmission is that its operation is to a large extent independent of frequency, at any rate over a usefully wide range of frequencies. In reception an in-phase combination of signals received on the two arrays will appear at one output port of the hybrid circuit arrangement this combination being produced from vertically polarised incoming waves and, as respects such waves, the polar diagram of received signal strength exhibits a relatively low "angle of fire" of from about 0° to about 10° to the horizontal. At the other output port of the hybrid circuit arrangement an anti-phase combination of signals produced from horizontally polarised waves will appear and, as respects these waves, the polar diagram exhibits a substantially higher angle of fire extending from about 20° to about 40° to the horizontal. In a typical case of high frequency propagation over a medium range, signals which have travelled in accordance with a "one hop" transmission mode will arrive with angles of elevation of up to about 10° and signals which have travelled in accordance with a "two hop" transmission mode will arrive with angles of elevation between about 20° and 40°. Accordingly good diversity reception can be obtained by utilising the in-phase signals or the anti-phase signals or both, in accordance with circumstances.

Similarly, in the case of a transmitting system in accordance with this invention energisation of the arrays through the hybrid circuit arrangement by feeding signals from the transmitter to one part of the said arrangement will give a low angle of elevation (angle of fire) while a high angle can be obtained by feeding the other port, so that operation may be suited to the propagation conditions existing at any time.

Preferably the aerials of the two arrays are carried, at their upper ends by supporting non-conducting ropes from a catenary suspension system at the "ridge" of a V arrangement in the "sides" of which the arrays and their supporting ropes lie, the catenary suspension system being supported by a relatively high mast at one end and a lower support at the other.

The catenary suspension system may be a rope catenary supported between two masts or it may consist of two or more rope catenaries in line (when viewed from above) with an additional intermediate mast or masts at the junction or junctions of the catenaries. In the latter case, owing to the location of the additional intermediate mast or masts within the length of the aerial sytem, said mast or masts must, of course, be of wood or other non-conductive material.

The hybrid arrangement may take any of a variety of forms known per se. One conventional form suitable for use in reception consists of a resistance network known per se.

In reception the two outputs of the hybrid may be taken to a switch whereby either may be selected manually at will. However, computer or similarly controlled means, actuated in dependence upon the strengths of the in-phase and anti-phase signals and operating in any convenient manner known per se, may be provided for selecting one of said signals, or both, for utilisation in accordance with the propagation conditions existing at the time.

The invention is illustrated in the accompanying drawings in which.

Figure 1:
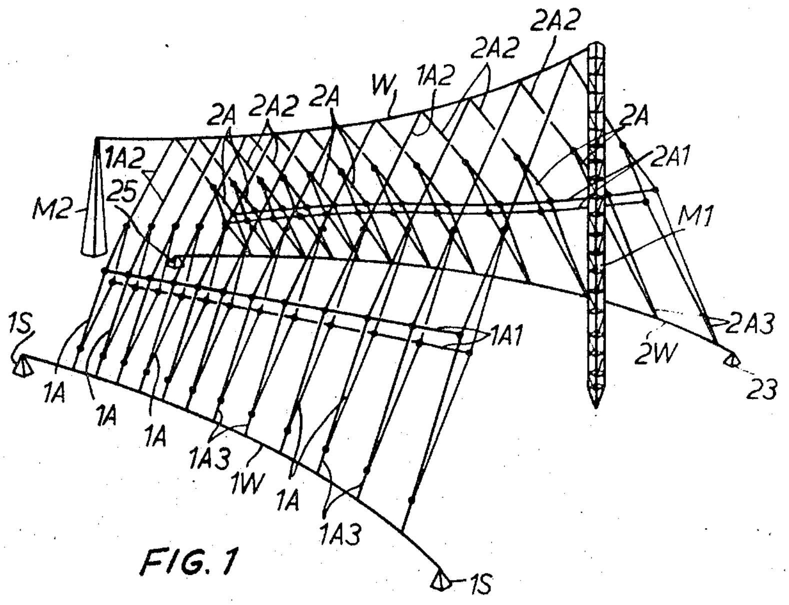
FIGURE 1 is a schematic and simplified perspective view of one embodiment employing an aerial system the upper ends of the arrays of which are supported by a catenary support.

Referring to FIGURE 1 the radio system therein illustrated comprises an aerial system having two logarithmic arrays each at 45° to the horizontal and at 90° to the other. The aerials of one array are referenced 1A and those of the other are referenced 2A. As shown each array has twelve aerials but there may, of course, be any number. The aerials of each array increase in length logarithmically from one end of the array to the other and the aerial spacing is also increased logarithmically in the same direction in accordance with normal logarithmic array practice. Each array has the customary "back-bone" feeder 1A1 or 2A1.

The upper ends of the aerials 1A and the upper ends of the aerials 2A are supported by non-conducting ropes 1A2 or 2A2 from a catenary non-conducting rope support W slung between a relatively high mast M1 and a stub mast or other suitable support M2. The rope W lies, as will be seen, at the "ridge" of a V arrangement in the "sides" of which lie the arrays and their support ropes. The lower ends of the aerials of the arrays are supported by ropes 1A3 or 2A3 from lower catenary ropes 1W or 2W slung between suitable supports 1S or 2S.

In the case of a long aerial system, support may be given by two (or more) catenary ropes in line, instead of only one, with one (or more) intermediate masts where the catenaries adjoin. Since such intermediate masts will be inside the V arrangement they must obviously not be conductive masts.

Figure 2:
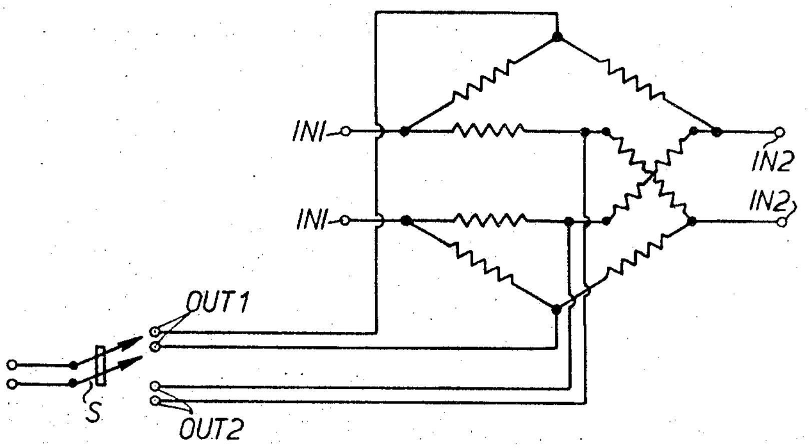
FIGURE 2 is a known kind of hybrid circuit suitable for use in connection with an aerial system according to the invention.

The feeders 1A1 and 2A1 are respectively connected at their left hand ends (in FIGURE 1) to the two inputs 1N1 and 1N2 of a known hybrid represented in FIGURE 2. The one shown is a known resistance network hybrid (this is suitable for reception) but it is illustrated only as an example and other known forms of hybrid may be used and would be used if transmission was desired. In reception an in-phase signal will appear at terminals OUT1 and an anti-phase signal will appear at terminals OUT2. For simple diversity reception manual selection of the signals may be arranged for by providing a switch S as shown, but, as known per se, received signals appearing at OUT1 and OUT2 may be combined or selected in any convenient manner known per se e.g. under control of a computer actuated by the two output signals. Alternatively the outputs at OUT1 and OUT2 may be fed to separate detecting receivers the outputs of which may be selected or combined as already described herein, a suitable phase difference to compensate for different propagation times of incoming signals being provided, as again already described, between the paths to the receiver outputs from OUT1 and OUT2 respectively. For transmission either a high or a low angle of elevation of transmitted beam can be obtained by switching a transmitter to feed into either terminals OUT1 or terminals OUT2.

In order to avoid complication of the drawing in FIGURE 1 the two arrays are shown as supported from a single catenary rope W. In practice it is preferred to provide two such catenary ropes, side by side, each supporting a different one of the two arrays. This arrangement is preferred because it enables either array to be lowered alone for servicing or repair leaving the other array in position for use.

Figure 3:
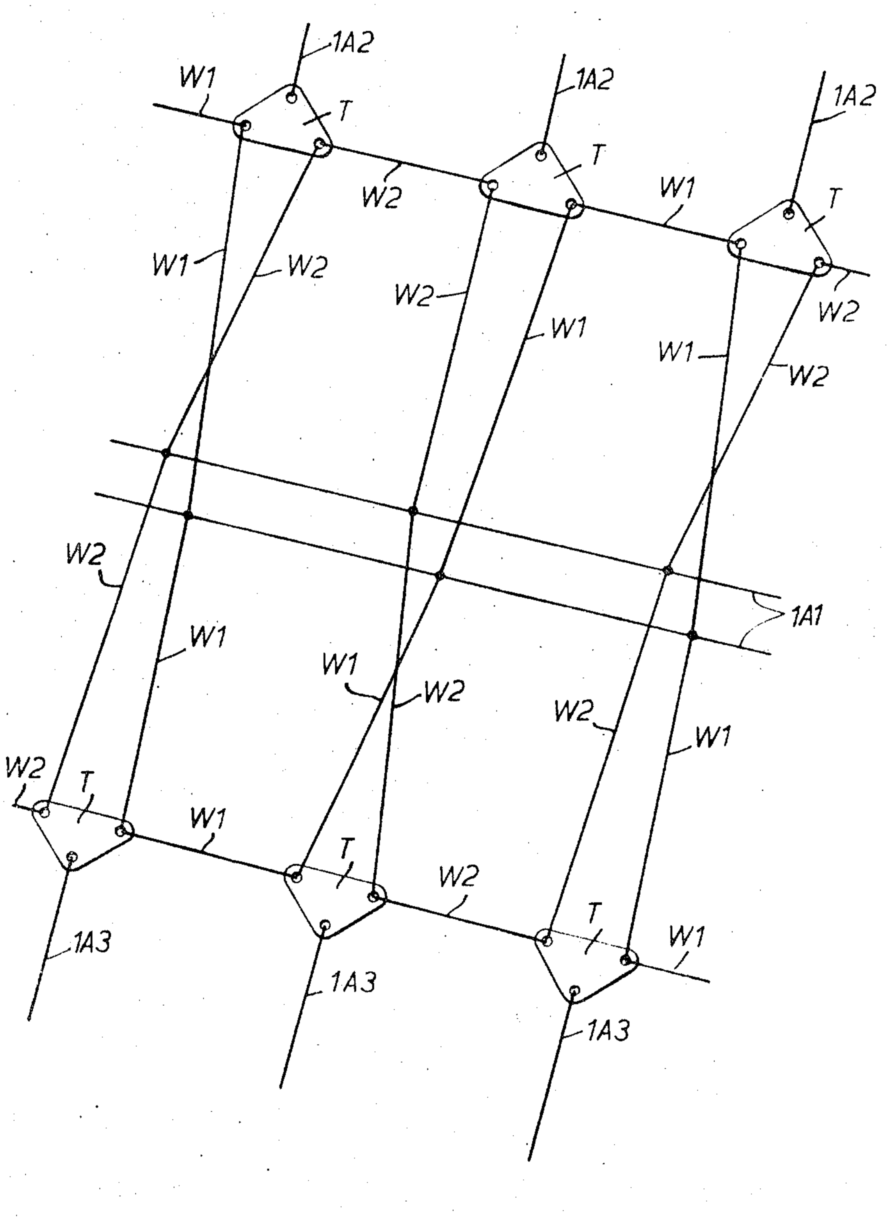
FIGURE 3 is a part view showing a preferred construction for the radiators used in the system of FIGURE 1.

Again, for simplicity of drawing the aerials 1A and 2A are purely diagrammatically represented in FIGURE 1 because of the difficulty of showing them correctly in detail to the scale of that figure. FIGURE 3 shows a portion of the array comprising the aerials 1A in more detail. As will be seen the array consists of rectangular loops as in British Patent No. 976,870. These rectangular loops are composed of wires W1 and W2, each in a rectangular zig-zag and connected to the feeder wires 1A1 as shown. The wires W1 and W2 are supported by the ropes 1A2 and 1A3 through the medium of the triangular insulators T. If desired, insulating spans (not shown) may be provided between the adjacent connections of the wires W1 and W2 with the wires of the feeder 1A1. The other array comprising aerials 2A is, of course, similar.

The invention is not limited to the use of the particular aerials shown in FIGURE 3 and any known suitable form of radiator element e.g. simple dipoles as in British Patent No. 884,889 may be used.

I claim:

1. A high frequency radio transmitting or receiving system comprising an aerial system consisting of two logarithmic aerial arrays which incline towards one another at substantially 90° and each of which is at substantially 45° to the horizontal; and a four port hybrid circuit arrangement having two ports coupled respectively to the two arrays and two other ports serving as signal input or output ports.

2. A receiving system as claimed in claim 1 wherein received signals from the two arrays are fed to two of the ports of the hybrid circuit arrangement and means are provided for taking output to a receiver from either of the two remaining ports of the hybrid circuit arrangement at will.

3. A receiving system as claimed in claim 1 wherein received signals from the two arrays are fed to two of the ports of the hybrid circuit arrangement and means are provided for taking output from the two remaining ports of the hybrid circuit arrangement to two separate detecting receivers, means being provided for selecting at will the detected output from either receiver.

4. A receiving system as claimed in claim 1 wherein received signals from the two arrays are fed to two of the ports of the hybrid circuit arrangement and means are provided for taking output from the two remaining ports of the hybrid circuit arrangement to two separate detecting receivers, means being provided for combining the detected outputs of the two receivers.

5. A receiving system as claimed in claim 4 wherein the signal paths from the hybrid circuit arrangement output ports to the detected signal output terminals of the receivers are made of different delay.

6. A receiving system as claimed in claim 5 wherein the difference of delay is adjustable.

7. A transmitting system as claimed in claim 1 comprising a transmitter and means for connecting the same to feed signals for transmission into the hybrid circuit arrangement as either of said two other ports at will.

8. A system as claimed in claim 1 wherein the aerials of the two arrays are carried, at their upper ends by supporting non-conducting ropes from a catenary suspension system as the "ridge" of a V arrangement in the "sides" of which the arrays and their supporting ropes lie, the catenary suspension system being supported by a relatively high mast at one end and a lower support at the other.

References Cited

UNITED STATES PATENTS 1,898,058 2/1933 Lindenblad ---------- 343—854
2,904,677 9/1959 Heidester -------- 343—876 XR ELI LIEBERMAN, Primary Examiner M. NUSSBAUM, Assistant Examiner U.S. Cl. X.R.

343—853, 858, 886